(12) United States Patent
Liu et al.

(10) Patent No.: US 11,668,873 B2
(45) Date of Patent: Jun. 6, 2023

(54) OPTICAL FIBER SENSORS

(71) Applicant: Worcester Polytechnic Institute, Worcester, MA (US)

(72) Inventors: Yuxiang Liu, Worcester, MA (US); Pratap Rao, Northborough, MA (US); Yundong Ren, Clinton, MA (US); Mucheng Li, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 17/584,745

(22) Filed: Jan. 26, 2022

(65) Prior Publication Data
US 2022/0236484 A1 Jul. 28, 2022

Related U.S. Application Data

(60) Provisional application No. 63/141,844, filed on Jan. 26, 2021.

(51) Int. Cl.
G02B 6/12 (2006.01)
G02B 6/02 (2006.01)
G02B 6/42 (2006.01)
G02B 6/35 (2006.01)

(52) U.S. Cl.
CPC ......... G02B 6/12007 (2013.01); G02B 6/021 (2013.01); G02B 6/3512 (2013.01); G02B 6/4214 (2013.01)

(58) Field of Classification Search
CPC .. G02B 6/12007; G02B 6/021; G02B 6/3512; G02B 6/4214; G01N 21/783; G01N 21/81; G01N 2021/7716; G01N 21/7703
See application file for complete search history.

(56) References Cited

U.S. PATENT DOCUMENTS

| 5,440,927 A | 8/1995 | Chu et al. |
| 6,582,658 B1 | 6/2003 | Hood et al. |
| 8,271,198 B2 | 9/2012 | Teder |
| 8,817,266 B2 | 8/2014 | Wilson et al. |
| 10,527,539 B2 * | 1/2020 | Limodehi ............ G01D 5/353 |

(Continued)

FOREIGN PATENT DOCUMENTS

EP 0335128 A2 10/1989

OTHER PUBLICATIONS

"Optical fiber refractometers based on lossy mode resonances supported by TiO2 coatings" by Hernaez et al, Jul. 9, 2010, Applied Optics, vol. 49, No. 20 (Year: 2010).*

(Continued)

*Primary Examiner* — Ellen E Kim
(74) *Attorney, Agent, or Firm* — Armis IP Law, LLC

(57) ABSTRACT

A fiber optic sensing device includes an optical fiber having a polished end defining a flat sensory portion coated with a lossy-mode-resonance (LMR) coating. A reflective coating on an end face of the optical fiber facilitates propagation of a return signal. An optic circuit for identifies a wavelength attenuated by the LMR coating from the return signal reflected by the reflective coating based on a moisture presence at the sensory portion. Various gaseous parameters may be detected based on the coating on the sensory portion. An LMR coating of tin oxide ($SnO_2$) is employed for moisture sensing.

20 Claims, 7 Drawing Sheets

(56) References Cited

U.S. PATENT DOCUMENTS

| | | | | |
|---|---|---|---|---|
| 10,725,373 B1* | 7/2020 | Kumar | ................ | G02B 1/02 |
| 2008/0129980 A1* | 6/2008 | Dhawan | ................ | G01C 3/00 |
| | | | | 356/12 |
| 2012/0288227 A1* | 11/2012 | Kim | ................ | G01N 21/7703 |
| | | | | 427/535 |
| 2018/0031485 A1* | 2/2018 | Delgado Alonso | ................ | |
| | | | | G01N 21/6408 |
| 2018/0335383 A1* | 11/2018 | Lin | ................ | G01N 21/553 |

OTHER PUBLICATIONS

"Optical fiber humidity sensors based on Localized Surface Plasmon Resonance (LSPR) and Lossy-mode resonance (LMR) in overlays loaded with silver nanoparticles" by Rivero et al, Oct. 2012, Sensors and Actuators B: Chemical, vol. 173, pp. 244-249 (Year: 2012).*

International Search Report, PCT/US2022/013814, dated Apr. 28, 2022, pp. 1-2.

* cited by examiner

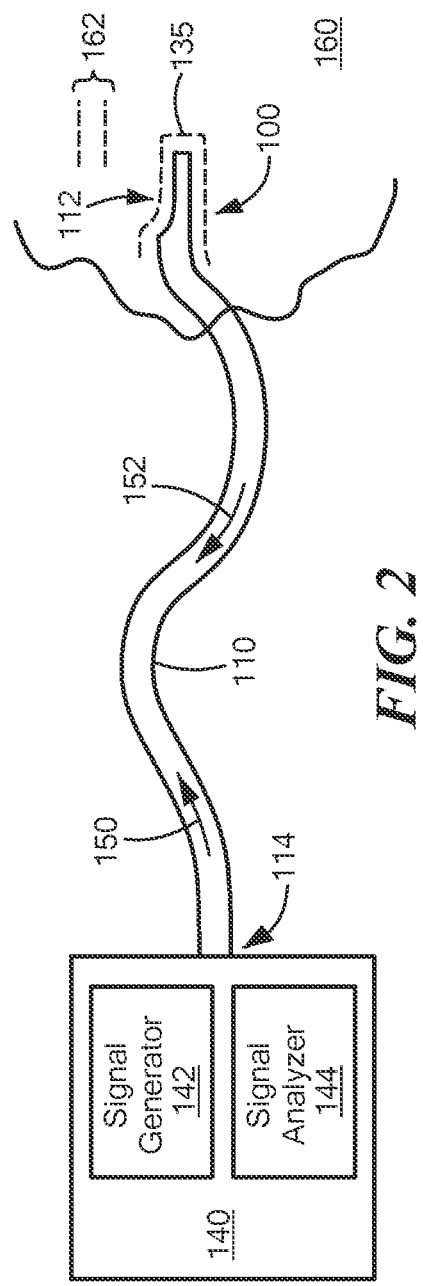
FIG. 2
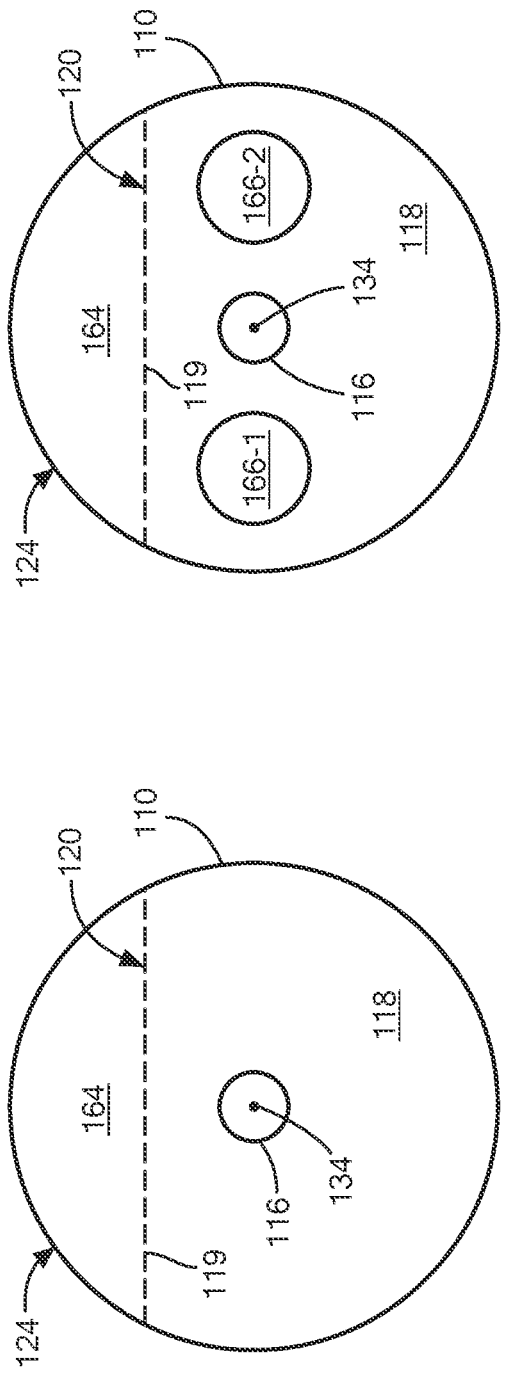
FIG. 3A
FIG. 3B

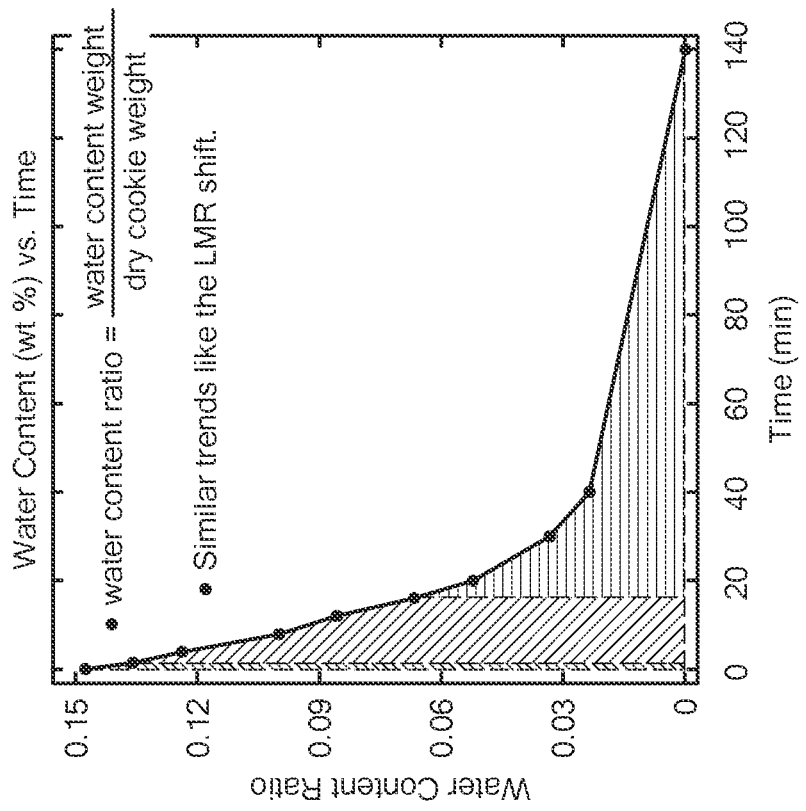
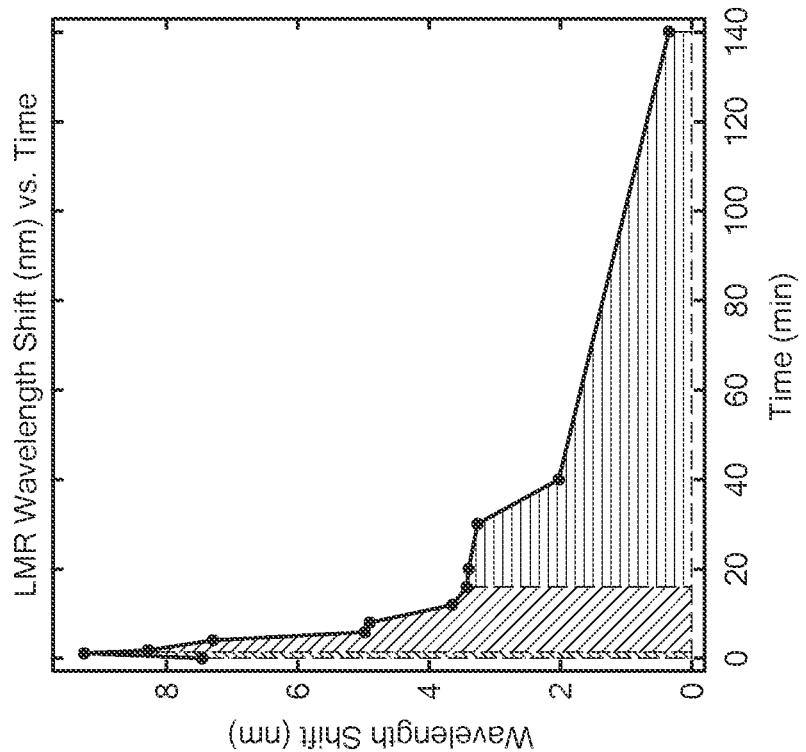
FIG. 9B
FIG. 9A

OPTICAL FIBER SENSORS

RELATED APPLICATIONS

This patent application claims the benefit under 35 U.S.C. § 119(e) of U.S. Provisional Patent App. No. 63/141,844, filed Jan. 26, 2021, entitled "OPTIC FIBER SENSORS," incorporated herein by reference in entirety.

BACKGROUND

Sensors are important for any physical systems to be aware of their status, environments, and processes. Some of the most commonly used sensors directly detect single physical parameters such as temperature, humidity, airflow, speed, light, voltage and vibration, for example. Other sensors fulfil the task indirectly by combing several basic sensed parameters to render the desired one. Electrical sensors are popular for ease of use and signal interpretation, as may systems employ at least some level of electronic circuitry and/or logic. Sensors are often disposed in harsh or extreme environments, therefore it is significant to ensure the sensors in such applications can survive and their readings are not influenced in the deployment environments, such as high heat, agitation, strong air currents, dust, or corrosive environments, for example.

SUMMARY

A fiber optical moisture sensing device includes an optical fiber having a side-polished end defining a flat sensory sidewall coated with an around 200-nm metal dioxide layer that support a special optical mode called a lossy mode resonance (LMR) coating. A reflective coating on an end face of the optical fiber serves as a mirror and reflects the optical signal in the same fiber. The reflected light guided along the fiber is detected by an optical spectrometer, providing real-time measurements of the optical spectrum, which is the dependence of optical intensity on wavelength. A typical spectrum from the sensor is a bell shape with a dip, where the dip corresponds to the wavelength at which the LMR exists and hence the light intensity in the fiber is lost. Since the wavelength of LMR is dependent on the amount of moisture presence at the fiber sensory portion, the LMR wavelength shifts provide measurements of the moisture around the tip of the fiber. In addition to the moisture, various gaseous parameters may be detected based on the coating on the sensory portion. An LMR coating of tin oxide ($SnO_2$) is currently employed for moisture sensing.

Configurations herein are based, in part, on the observation that the majority of sensors are based on an electrical response from a physical deployment environment, or sensed area. Unfortunately, such conventional electrical sensors suffer from the shortcoming that ambient electromagnetic waves, such as microwaves, can mix with or even overwhelm the electrical sensing signals, which reduces the measurement faithfulness or making it impossible to measure. Manufacturing contexts often employ electric motors and actuators which introduce a magnetic presence. Microwave sources are often present in food processing environments, and are incompatible with metal structures which commonly exist in metal electrodes and contacts in electrical sensors. Accordingly, configurations herein substantially overcome the shortcoming of conventional electrical sensors by providing a hair-sized, versatile, optical fiber-tip sensor that can be used to carry out moisture, chemical, and biological measurements.

Configurations herein address a need for small, highly sensitive, and robust sensors that can provide measurements in contexts such as manufacturing, other industries, as well as in point-of-care applications. For example, there is a need for relative humidity sensors in the food industry for the drying process control of food. It is desired that the sensor can not only measure low relative humidity (<10%) but also can be implemented in environment with complex physical conditions and constraints including 1) presence of microwave, 2) high temperature (>300° C.), and 3) narrow spaces (<1 mm).

Conventional industrial sensors rely on electrical signals, and do not meet the above-mentioned requirements. They have limited sensitivity and cannot be used in microwave or high temperature environments. A relative humidity sensor based on nonelectrical sensing mechanism would be beneficial and sometimes the only sensing option. An optical fiber sensor that is intrinsically immune to the electromagnetic interference and that withstands high temperature environments can address these needs based on an optical fiber sensing medium.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a block diagram of the optical fiber sensing device using the sensory tip of FIGS. A and 1B;

FIGS. 3A and 3B show cross sections of optical fibers suitable for use in the configurations of FIGS. 1A-2;

FIGS. 9A and 9B are a comparison of the lossy-mode-resonance signal as in FIG. 8 to a moisture content percentage.

DETAILED DESCRIPTION

The description below presents an example of the fiber optical sensor in a moisture sensing application particularly amenable to food preparation. Alternate approaches may be deployed for other fluidic sensing based on an effect of the sensed liquid or gas on the waveguide material applied to a sensory tip of the optical fiber.

Figure 1A:
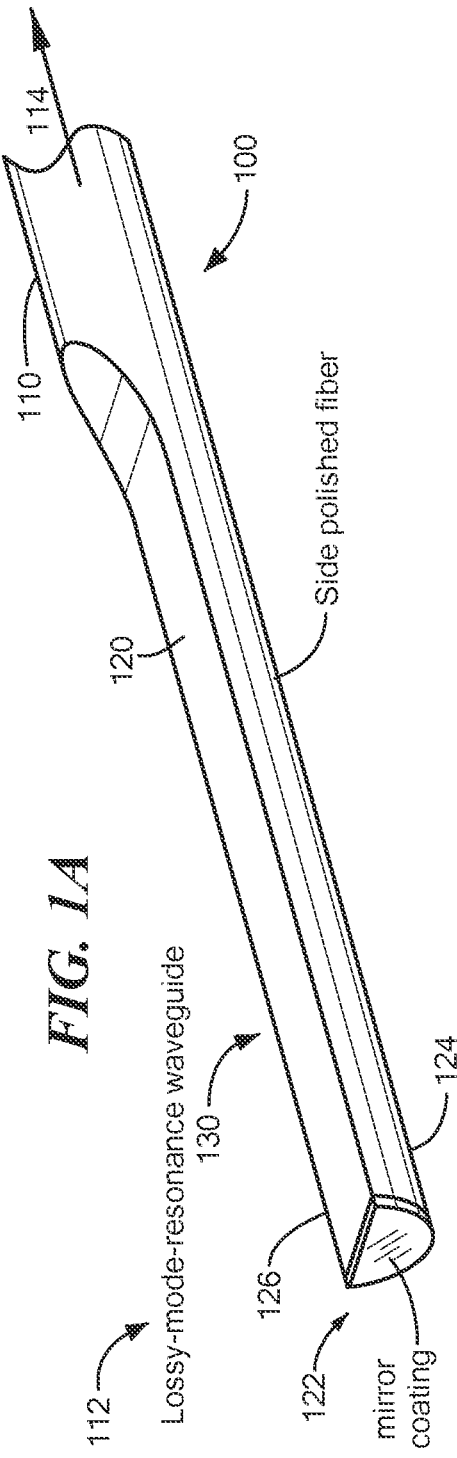
FIGS. 1A and 1B show a sensory tip of an optical fiber depicting the optical fiber sensing device.
Figure 1B:
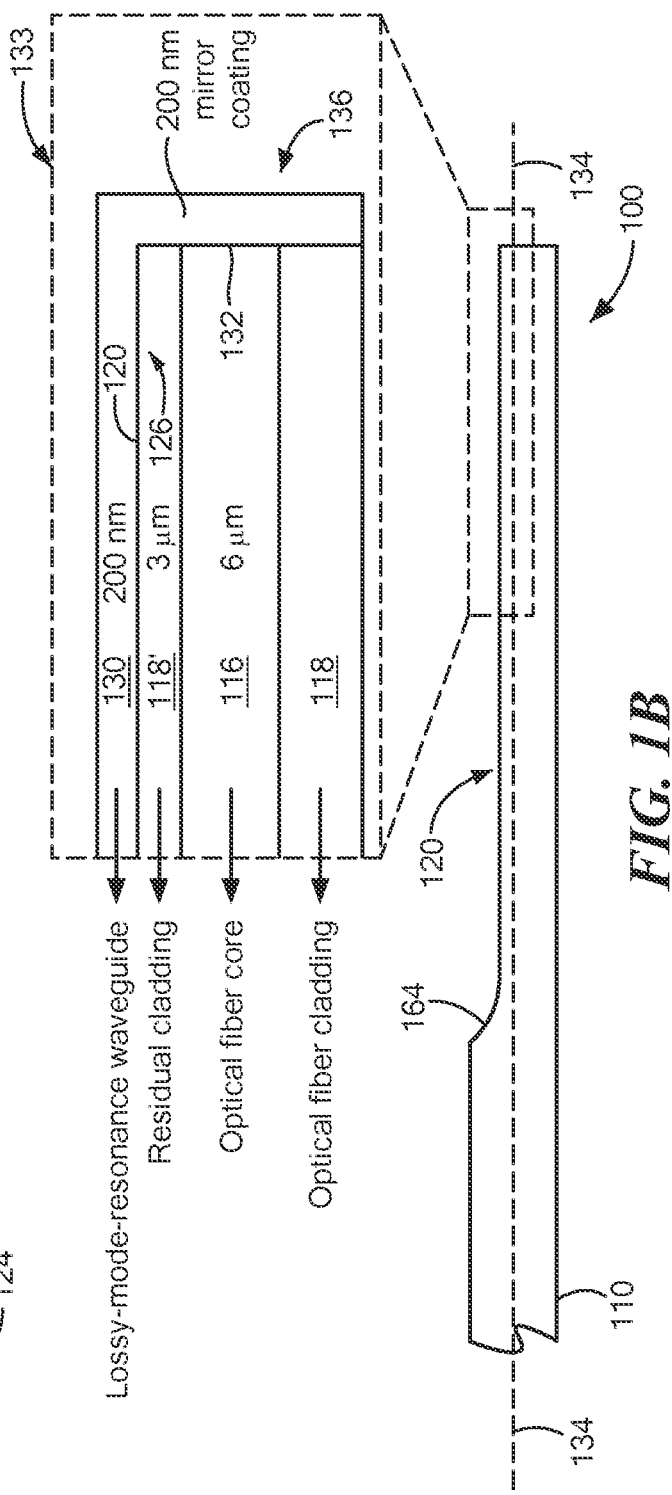

FIGS. 1A and 1B show a sensory tip of an optical fiber depicting the optical fiber sensing device. FIG. 1 shows an optical fiber sensor device 100, including an optical fiber 110 having a proximate end 112 and a distal end 114. A sensory region 120 formed at the proximate end 112 is defined by an asymmetric cross section 122 exhibiting a truncated cylindrical or annular surface 124 and a flat surface 126. A sensory coating 130 disposed on the flat surface 126 is responsive to a gaseous presence for returning a signal having a wavelength based on the gaseous presence, discussed further below. In contrast to conventional approaches, the sensory coating is a lossy-mode-resonance waveguide applied to the flat surface 126 of the D-shape cross section 122. In contrast, conventional fabrication methods either require the fiber to be glued onto a substrate which cannot be separated easily after the fabrication, or do not include a practical process of transforming the D-shape fiber into the fiber-tip form factor.

Although the illustrated configuration is specific for moisture sensing, the design can be used for other sensing such as chemicals and biologicals. The sensor design includes a side polished D-shape fiber tip, a lossy-mode-resonance waveguide coated on the polished surface, and a mirror coating on the end face of the tip. The mirror coating reflects light back into the fiber and allows optical input and read out along the same fiber. The lossy-mode resonance waveguide is also acting as the sensing material and is chosen based on the sensing needs. In this case, a 200-nm-thick $SnO_2$ (Tin Oxide) coating is chosen for moisture sensing.

Referring to FIG. 1B, the end surface 132 perpendicular to an axis 134 of the optical fiber at the distal end has a reflective coating 136 applied to the end surface 132 at a tip 133 of the sensory region 120. In the example of FIGS. 1A and 1B, the sensory region 120 further includes the polished flat surface 126 and a tin oxide coating for the lossy-mode resonance waveguide responsive to moisture, discussed further below.

The flat surface 126 results from material removal from the annular side to form a cross section having an appearance of a "D." The optical fiber 110 includes a core 116 and a surrounding cladding 118, of about 59.5 um. Material removal from polishing erodes a portion of the cladding to form a thinner cladding 118' defining the flat surface 126.

FIG. 2 is a block diagram of the optical fiber sensing device using the sensory tip of FIGS. 1A and 1B. Referring to FIGS. 1A-2, the optical fiber 110 emanates from an optical circuit 140 attached to the distal end 114 end and configured for transmitting an optical signal to the proximate end 112. The optical circuit 140 further comprises a signal generator 142, which may be any suitable optical signal generator or light source for transmitting a forward signal 150 having a predetermined wavelength, and a signal analyzer 144 responsive to a return signal 152. The return signal 152 has a wavelength based on a portion of the forward propagated signal 150 attenuated by the sensory coating 130 and returned by the reflective coating 136.

Certain deployments such as food service insert the sensor 100 into or adjacent to sensed mediums 160 such as food products for detecting doneness based on moisture. Accordingly, the sensor 100 may be wrapped in a filter sheath 135 such as a PTFE (PolyTetraFluoroEthylene) sheet enveloping the distal end for passing moisture and preventing contaminants from reaching the sensory coating 130. The sheathing 135 allows moisture particles 162 to pass to the sensory coating 130 while preventing other contaminants.

FIGS. 3A and 3B show cross sections of optical fibers suitable for use in the configurations of FIGS. 1A-2. Referring to FIGS. 3A and 3B, the optical fiber 110 has a central core 116 and a concentric cladding 118 around the core, where the central core is defined by a circular shape and the cladding has a truncated circular shape along a polishing/grinding depth 119, such that the truncation corresponds to the flat region 120. The flat region 120 forms a sloped transition 164 from the annular surface 124. In an alternate configuration, the optical fiber 110 is a polarization maintaining fiber 110' (PMF), which also has a centrally disposed core 116 for signal transport and defining an axis 134, and also two optical stress elements 166-1 . . . 166-2 (166 generally), which are glass cylinders parallel to the axis with a different refractive index from the cladding 118, such that the PMF 110' provides a movement insensitivity to the polarization of the return light signal. In the PMF configuration, the centrally disposed core 116 occupies a circular region along the axis of the optical fiber 110', flanked by a plurality of channels 166 having a polarizing substance. This provides an insensitivity to movement as the sensor 100 may tend to oscillate or bend in response to air currents in a food preparation environment. In an example configuration, the diameter of the channels 166 is about ~40 um, and the center core 134 is ~8 um. The polished flat surface is about 3 um away from the edge of the core, and adjacent the channels 166. In the PMF 110', the flat region 120 defines a truncation of a circular cross section of the cladding 118, adjacent to and nonintersecting with the central core 116 and the channels 166. In other words, the optical fiber 110' is not polished to a depth 119 that breaches the core 116 or the channels 166.

Figure 4A:
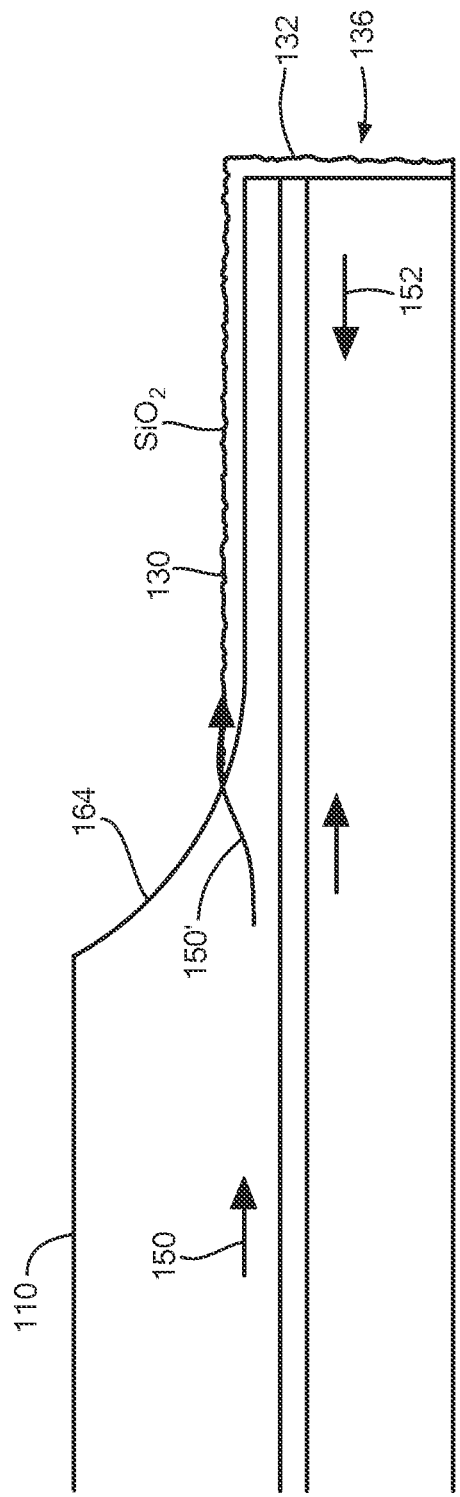
FIGS. 4A and 4B show signal propagation in the sensory tip of FIGS. 1A and 1B.
Figure 4B:
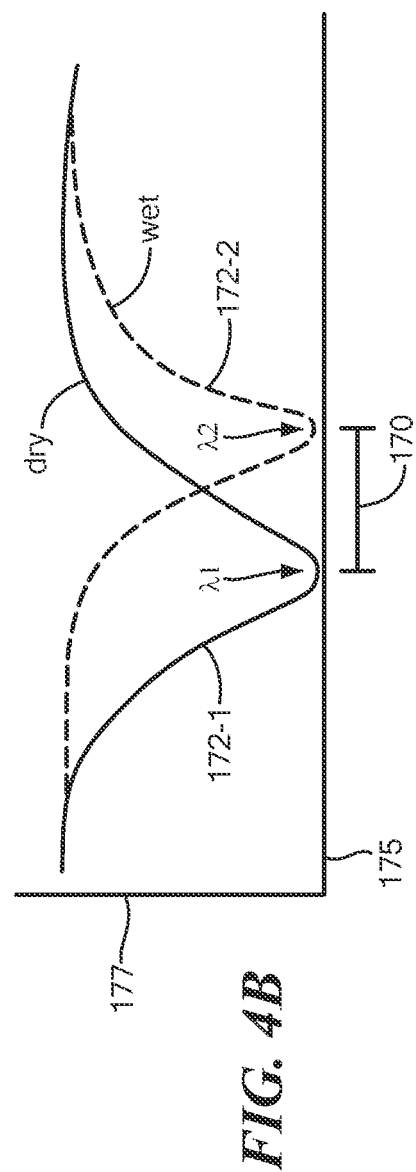

FIGS. 4A and 4B show signal propagation in the sensory tip of FIGS. 1A and 1B. In contrast to conventional sensors, the claimed fiber-tip type sensors do not require a large space with both a single hair-sized opening for input and output for its implementations. It can be inserted into small spaces with a closed end to measure moisture content changes. For example, experimental usage has demonstrated insertion of the sensor into a production food sample to measure its moisture content change in real-time during its drying. It is challenging for the in-line type sensor to carry out the same measurement without creating a long through hole in the sample for an input and output end.

Referring to FIG. 4A, and continuing to refer to FIG. 2, the forward signal 150 is attenuated and/or partially absorbed as certain wavelengths 150' are absorbed by the sensory coating 130 based on the moisture percentage at the sensory coating 130. The reflected return signal 152 exhibits wavelength patterns where the strength of certain wavelengths varies based on the sensed humidity. The return signal 152 defines a plurality of wavelengths, such that the plurality of wavelengths have differing intensities based on the moisture, as shown in FIG. 4B. The signal analyzer 144 measures a wavelength shift 170 based on the gaseous presence. In FIG. 4B, a graph of the dependence of received signal intensity 177 on wavelengths 175 depicts a first return signal 172-1 showing a low energy dip of a first wavelength $\lambda 1$ associated with a dryer sensed condition, and a second return signal 172-2 depicting a second wavelength $\lambda 2$ associated with a wetter condition. As a moisture percentage of a sensed medium 160 changes, the dip or low strength readings transition from $\lambda 2$ to $\lambda 1$, for example, as the medium dries.

In the example approach, depicting food product moisture for drying/doneness tests, the sensor 100 is formed by applying tin oxide as the sensory coating 130, where the tin oxide is responsive to a moisture content for absorbing certain frequencies in the forward signal 150. Thus, the absorbed frequencies are defined by the return signal 152 based on the moisture content. The signal analyzer 144 can measure an intensity of a plurality of frequencies in the return signal 152, such that the intensity of frequencies is based on an absorption of frequencies by the sensory coating 130. As shown by the signal strength in FIG. 4B, the signal analyzer 144 computes the presence and concentration of the gaseous presence based on the intensity of frequencies. The optical fiber 110 avoids crosstalk between the forward 150 and reverse 152 propagated signal so that the return signal indicates the inverse peaks defining the shift 170 in FIGS. 4B. A further advantage of the optical fiber 110 is that the return signal is agnostic to a magnetic or microwave presence at the sensory region since the optical fiber is free of electronics or metal.

Figure 5:
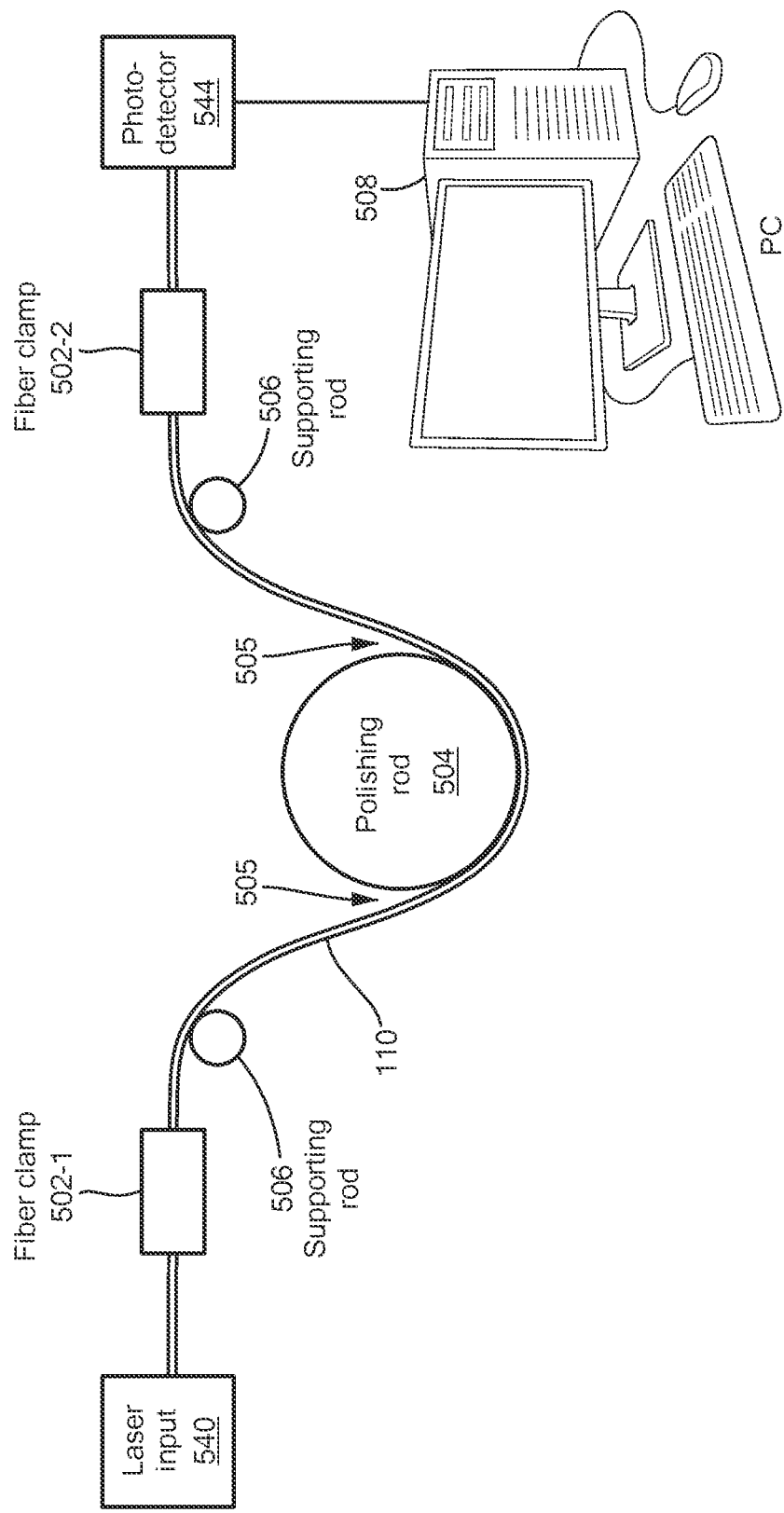
FIG. 5 shows formation of the optical fiber tip including the sensory region as in FIGS. 1A-4B.

FIG. 5 shows formation of the optical fiber tip including the sensory region as in FIGS. 1A-4B. The fabrication process of the sensor includes multiple steps. A single mode optical fiber 110 is side polished along a length of around 12 mm to form the flat surface 126 by forming an in-line D-shape fiber profile as shown in FIGS. 1A and 1B. To polish the fiber, a single mode SMF-28 optical fiber 110 is clamped onto two motorized stages 502-1 . . . 502-2 (502 generally) and stretched to wrap against the polishing post 504. The polishing post is formed from polishing paper or similar abrasive onto an aluminum rod and mounted on a shaft driven by a 12 Volts DC motor. Light is input from a laser source 540 and detected from a photodetector 544 during the polishing process. The real-time optical transmission from the fiber is used to monitor the polishing process for removal of the cladding layer as shown in FIGS. 3A and 3B. The extent of the polishing is determined by measuring a deformation depth of the flat surface 126 formed from the annular surface 124 of the optical fiber 110 based on a laser signal transmitted through the optical fiber 110 during polishing. Supporting rods 506 assist in guiding the polishing and depth in a polished region 505, and a PC 508 monitors the laser signal 544 received by the photodetector for attaining the proper depth 119. Upon attaining the depth 119, the optical fiber 110 is severed by breaking the optical fiber along the polished region 505 to generate a substantially perpendicular end surface 132. The lossy-mode-resonance (LMR) coating is applied to the flat surface.

Figure 6:
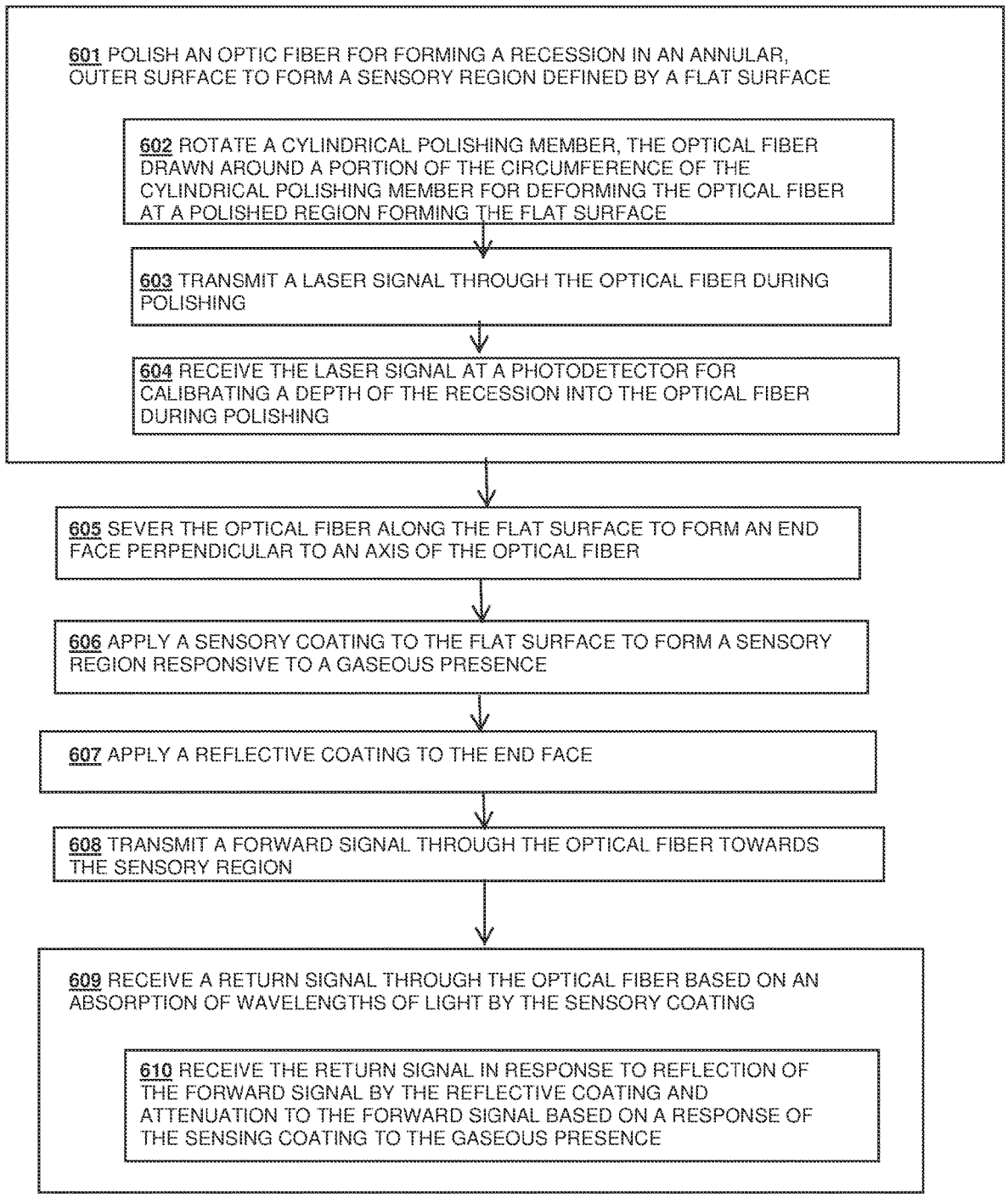
FIG. 6 is a flowchart of gaseous sensing for moisture using the optical sensing device of FIGS. 1A-5.

FIG. 6 is a flowchart of gaseous sensing for moisture using the optical sensing device of FIGS. 1A-5. Referring to FIGS. 1A-6, the method of detecting moisture in an industrially sensitive environment includes, at step 601 polishing an optical fiber for forming a recession in an annular, outer surface to form a sensory region 120 defined by a flat surface 126. As illustrated in FIG. 5, this includes rotating a cylindrical polishing member 504 as the optical fiber 110 is drawn around a portion of the circumference of the cylindrical polishing member 504 for deforming the optical fiber at a polished region 505 forming the flat surface 126, as depicted at step 602. Calibration of the extent, or depth, of polishing includes transmitting a laser signal through the optical fiber 110 during polishing, as depicted at step 603. The photodetector 544 receives the laser signal for calibrating the depth 119 of the recession into the optical fiber 110 during polishing, as shown at step 604.

Following polishing, the optical fiber is severed along the flat surface to form the end face 132 perpendicular to an axis 134, and hence to the flat surface 126, of the optical fiber 110, as depicted at step 605. The sensory coating is then applied to the flat surface to form the sensory region 120 responsive to a gaseous presence, as disclosed at step 606. A reflective coating is also applied to the end face 132 for facilitating reflection of the return signal, as depicted at step 607. In operation, the signal generator 142 transmits the forward signal 150 through the optical fiber 110 towards the sensory region 120, as depicted at step 608. The signal analyzer receives the return signal 152 through the optical fiber based on an absorption of wavelengths of light by the sensory coating 130, as shown at step 609. The return signal 152 is received in response to reflection of the forward signal 150 by the reflective coating 136 and attenuation to the forward signal based on a response of the sensory coating 130 to the gaseous presence, as depicted at step 610.

Figure 7:
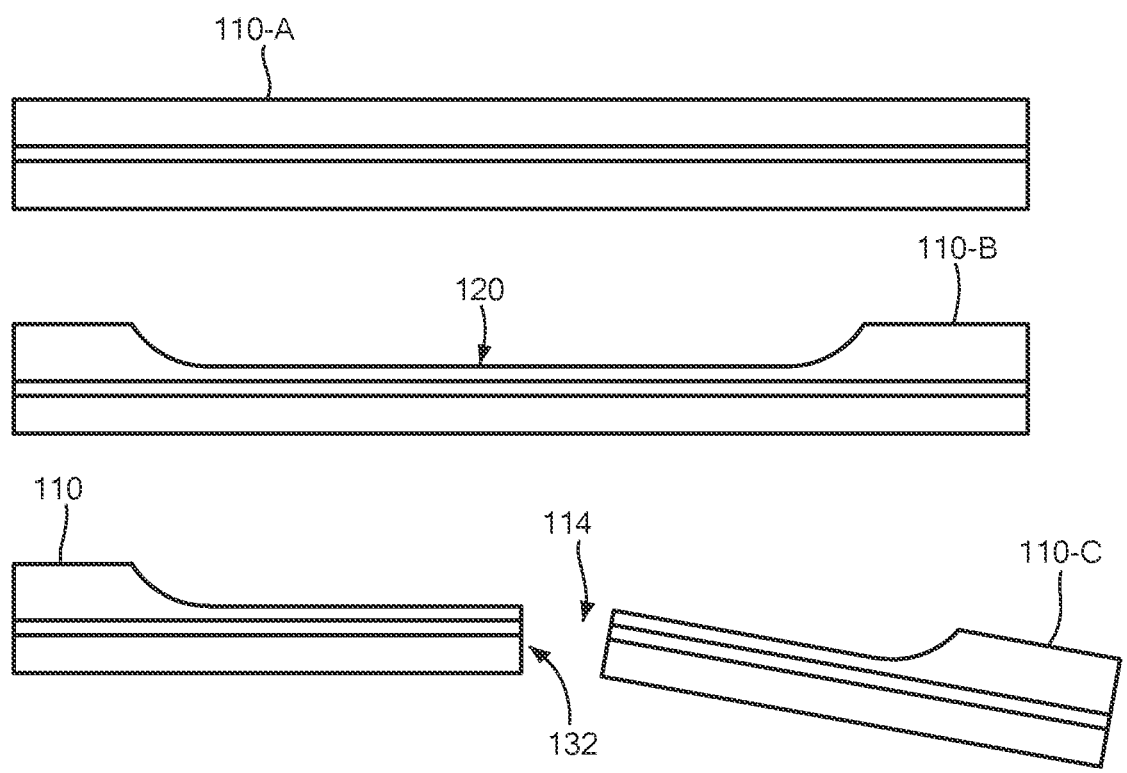
FIG. 7 shows formation of the tip of FIGS. 1A-5.

FIG. 7 shows formation of the tip of FIGS. 1A-5. Referring to FIGS. 1A-7, a source fiber 110-A is presented for polishing as in FIG. 5. The polished fiber 110-B exhibits the flat region 120. The fabrication method concludes with breakage of the D-shape polished fiber 110-B in order to achieve the fiber-tip form factor 110 and distal end 114 with end face 132. The remaining portion 110-C can be discarded or reused.

Figure 8:
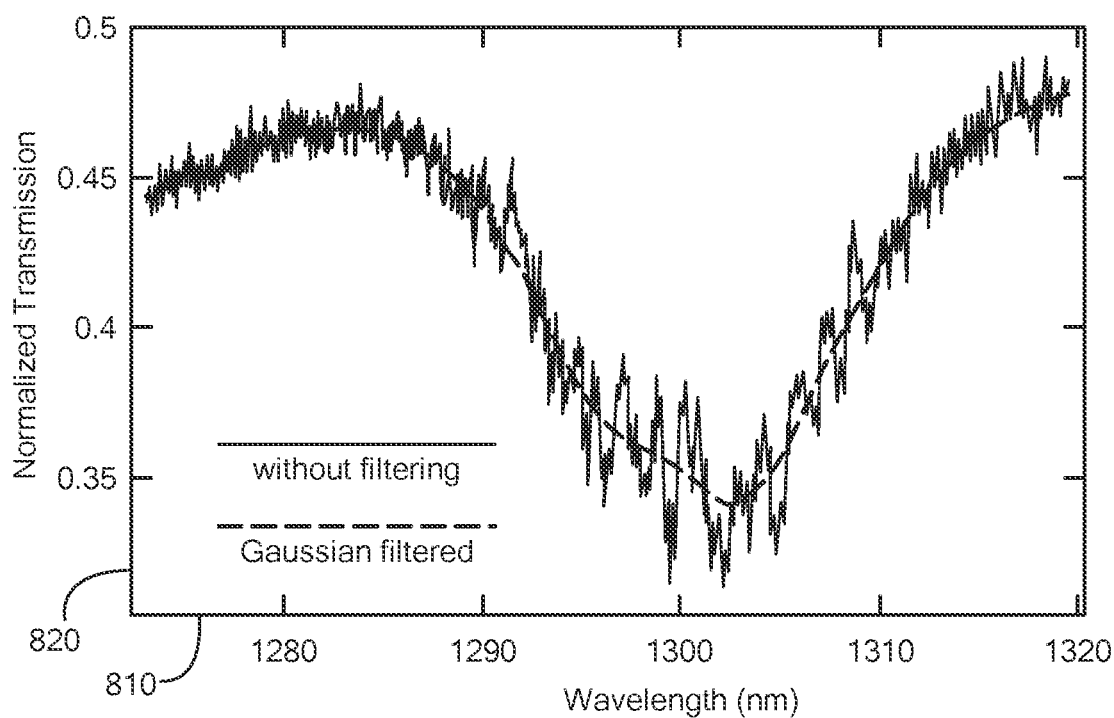
FIG. 8 shows the lossy-mode-resonance signal received from the sensory region.

FIG. 8 shows the lossy-mode-resonance signal received from the sensory region. In FIG. 8, a signal was acquired by sweeping the wavelength of the input light while monitoring the optical transmission change. The x-axis 810 shows the optical wavelength, and the y-axis 820 shows the normalized transmission. A smoother line shows the Gaussian filtered signal FIGS. 9A and 9B are a comparison of the lossy-mode-resonance signal as in FIG. 8 to a moisture content percentage. FIGS. 9A-9B validate the moisture content measurement from the optical fiber sensor 100 by comparing sensor output in FIG. 9A to the water weight ratio measurements of a sensed food product media 160, which is a widely accepted standard for moisture content measurement. The comparison shows that qualitatively, the response of the optical fiber sensor, based on lossy-mode-resonance wavelength shift as in FIG. 4B, is reflects the moisture content change for as small as 2% water content ratio in FIG. 9B.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. An optical fiber sensor device, comprising:
an optical fiber having a proximate end and a distal end;
a sensory region formed at the distal end, the sensory region defined by an asymmetric cross section and having an annular surface and a flat surface; and
a sensory coating disposed on the flat surface, the sensory coating responsive to a gaseous presence for returning a signal having a wavelength based on the gaseous presence.

2. The device of claim 1 further comprising:
an end surface perpendicular to an axis of the optical fiber at the distal end; and
a reflective coating applied to the end surface at a tip of the sensory region.

3. The device of claim 1 wherein the sensory region further comprises a polished surface and a tin oxide coating, the tin oxide coating responsive to moisture.

4. The device of claim 1 further comprising an optical circuit attached to the proximate end and configured for transmitting an optical signal to the distal end.

5. The device of claim 4 wherein the optical circuit further comprises a signal generator for transmitting a forward signal having a predetermined wavelength, and a signal analyzer responsive to a return signal, the return signal having a wavelength based on a portion of the forward propagated signal attenuated by the sensory coating.

6. The device of claim 1 wherein the optical fiber has a central core and a concentric cladding around the core, the central core defined by a circular shape and the cladding having a truncated circular shape, the truncation corresponding to the flat region.

7. The device of claim 1 wherein the optical fiber is a polarization maintaining fiber (PMF), the PMF having a centrally disposed core for signal transport and defining an axis, and one or more channels parallel to the axis, the PMF providing a movement insensitivity to the return signal.

8. The device of claim 6 wherein the centrally disposed core occupies a circular region along the axis of the optical fiber, flanked by a plurality of channels having a polarizing substance, the flat region defining a truncation of a circular cross section adjacent to and nonintersecting with the central core and the channels.

9. The device of claim 1 further comprising a filter sheath enveloping the distal end for passing moisture and preventing contaminants from reaching the sensory coating.

10. The device of claim 5 wherein the return signal defines a plurality of wavelengths, the plurality of wavelengths having differing intensities, the signal analyzer configured for measuring a wavelength shift based on the gaseous presence.

11. The device of claim 5 wherein the return signal is agnostic to a magnetic or microwave presence at the sensory region.

12. A method of detecting moisture in an industrially sensitive environment, comprising:
  polishing an optical fiber for forming a recession in an annular, outer surface to form a sensory region defined by a flat surface;
  severing the optical fiber along the flat surface to form an end face perpendicular to an axis of the optical fiber;
  applying a sensory coating to the flat surface to form a sensory region responsive to a gaseous presence; and
  receiving a return signal through the optical fiber based on an absorption of wavelengths of light by the sensory coating.

13. The method of claim 12 further comprising:
  rotating a cylindrical polishing member, the optical fiber drawn around a portion of the circumference of the cylindrical polishing member for deforming the optical fiber at a polished region forming the flat surface;
  transmitting a laser signal through the optical fiber during polishing; and
  receiving the laser signal at a photodetector for calibrating a depth of the recession into the optical fiber during polishing.

14. The method of claim 13 further comprising:
  measuring a deformation depth of the flat surface formed from the annular surface of the optical fiber based on a laser signal transmitted through the optical fiber during polishing; and
  severing the optical fiber by breaking the optical fiber along the polished region.

15. The method of claim 12 further comprising:
  applying a reflective coating to the end face;
  transmitting a forward signal through the optical fiber towards the sensory region; and
  receiving the return signal in response to reflection of the forward signal by the reflective coating and attenuation to the forward signal based on a response of the sensory coating to the gaseous presence.

16. The method of claim 15 further comprising applying tin oxide as the sensory coating, the tin oxide responsive to a moisture content for absorbing certain frequencies in the forward signal, the absorbed frequencies defined by the return signal based on the moisture content.

17. The method of claim 12 further comprising
  measuring an intensity of a plurality of frequencies in the return signal, the intensity of frequencies based on an absorption of frequencies by the sensing coating; and
  computing the presence and concentration of the gaseous presence based on the intensity of frequencies.

18. The method of claim 12 further comprising applying a lossy-mode-resonance (LMR) coating to the flat surface.

19. A fiber optical sensing device comprising:
  an optical fiber having a polished end defining a flat sensory portion coated with a lossy-mode-resonance (LMR) coating;
  a reflective coating on an end face of the optical fiber; and
  an optical circuit for identifying a wavelength attenuated by the LMR coating from a return signal reflected by the reflective coating based on a moisture presence at the sensory portion.

20. The method of claim 19 wherein the LMR coating is tin oxide.

* * * * *